April 21, 1953 R. B. WHITNEY ET AL 2,635,938
VENDING MACHINE
Filed April 8, 1946 10 Sheets-Sheet 2
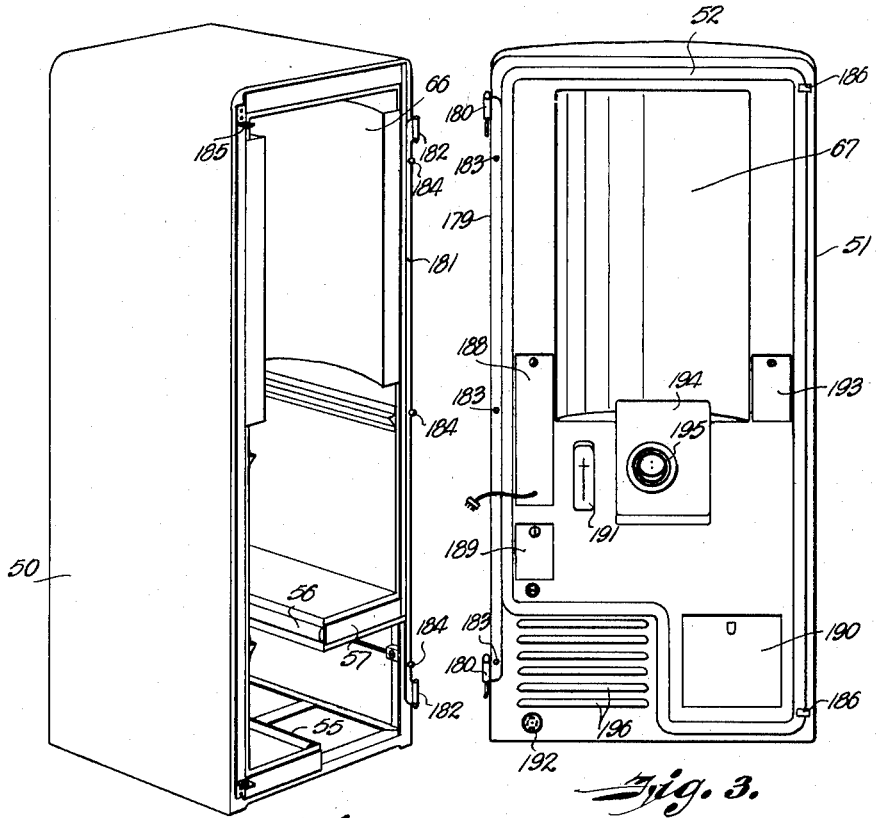
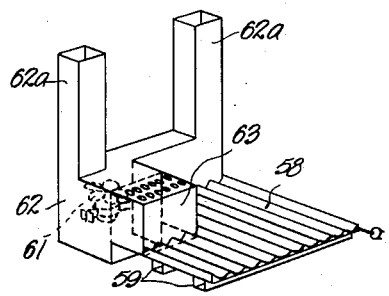
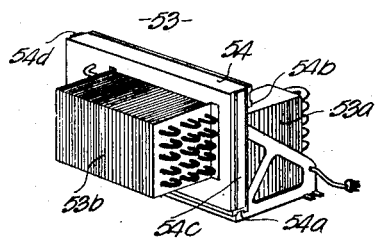
INVENTOR.
Robert B. Whitney
Wayne B. Weed
BY Thos. E. Scofield
ATTORNEY.

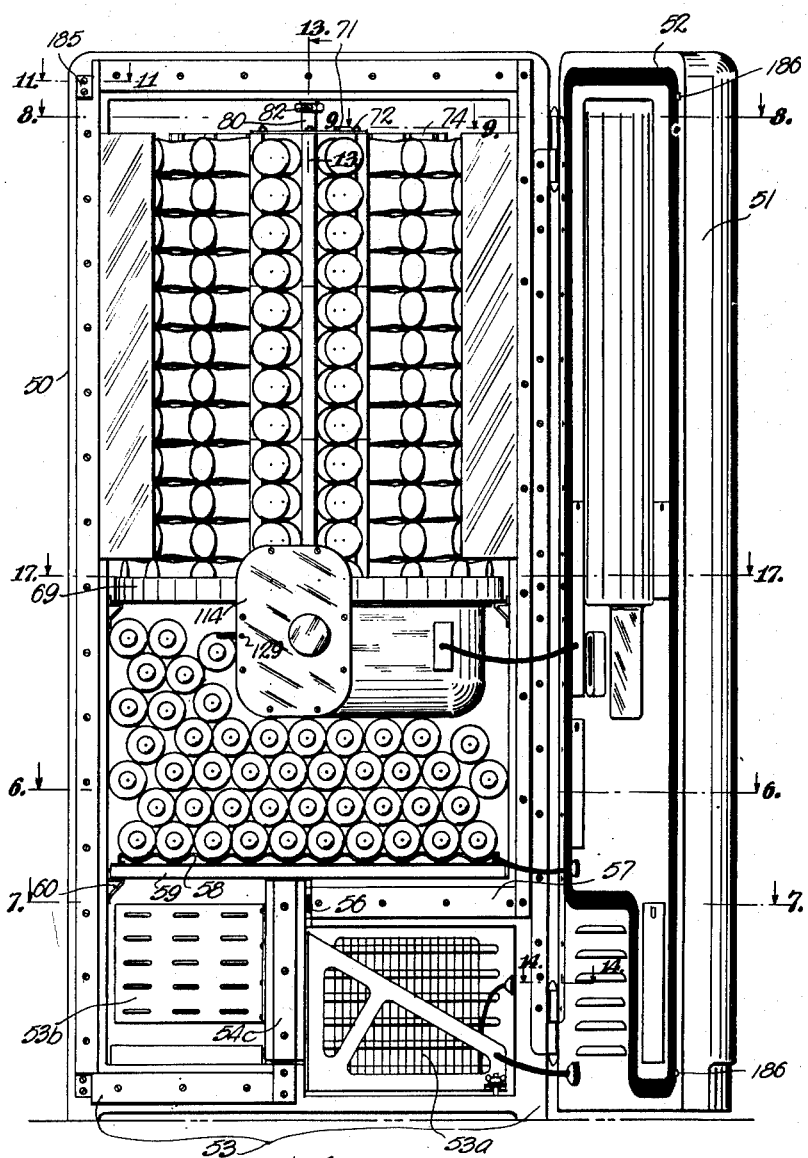

April 21, 1953  R. B. WHITNEY ET AL  2,635,938
VENDING MACHINE

Filed April 8, 1946                                        10 Sheets-Sheet 3

INVENTORS.
Robert B. Whitney
Wayne B. Weed
BY
Thos. E. Scofield
ATTORNEY.

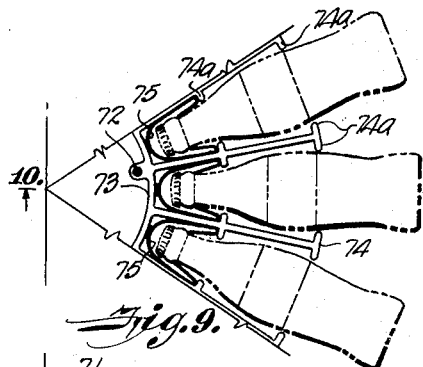

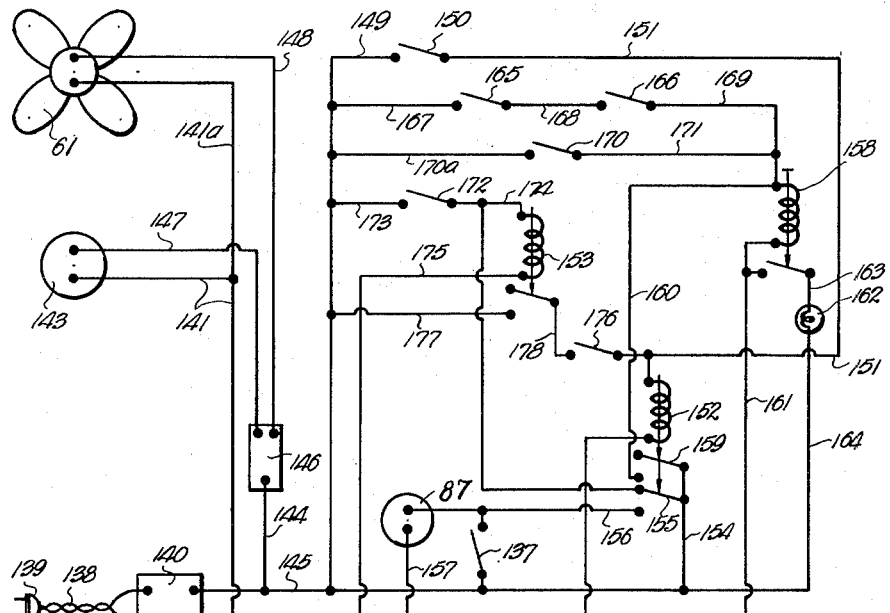
Fig. 16.
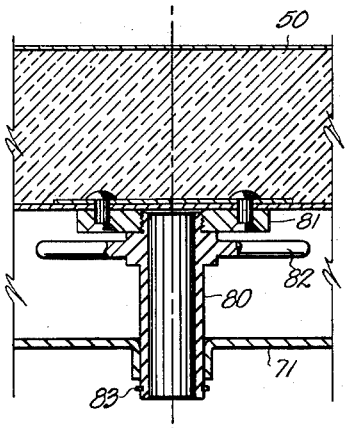
Fig. 13.
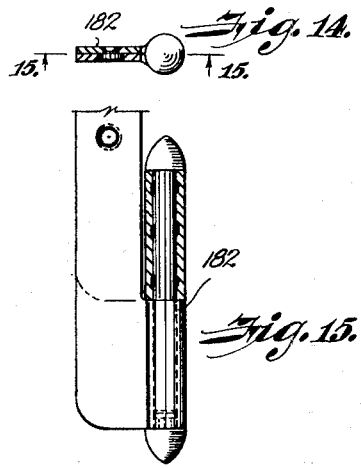
Fig. 14.
Fig. 15.
INVENTOR.
Robert B. Whitney
Wayne B. Weed
BY
ATTORNEY.

INVENTORS
Robert B. Whitney
Wayne B. Weed
BY
Thos. E. Scofield
ATTORNEY.

April 21, 1953

R. B. WHITNEY ET AL 2,635,938

VENDING MACHINE

Filed April 8, 1946

10 Sheets-Sheet 7

INVENTORS.
Robert B. Whitney
Wayne B. Weed
BY
Thos. E. Tesfield
ATTORNEY.

INVENTORS.
Robert B. Whitney
Wayne B. Weed
ATTORNEY.

April 21, 1953 R. B. WHITNEY ET AL 2,635,938
VENDING MACHINE
Filed April 8, 1946 10 Sheets-Sheet 9

INVENTORS.
Robert B. Whitney
Wayne B. Weed
BY
ATTORNEY.

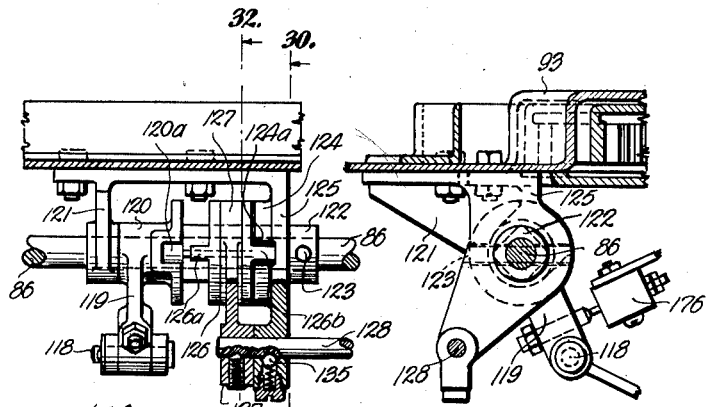
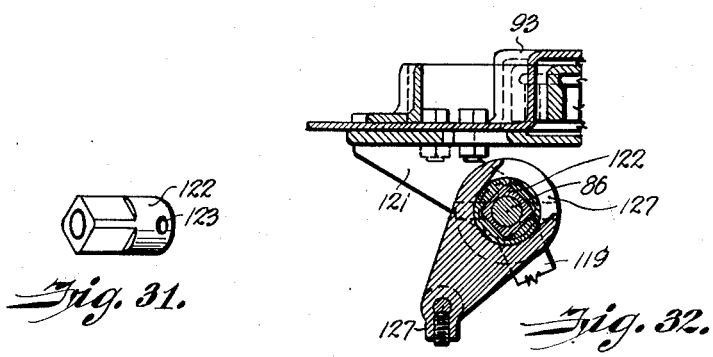
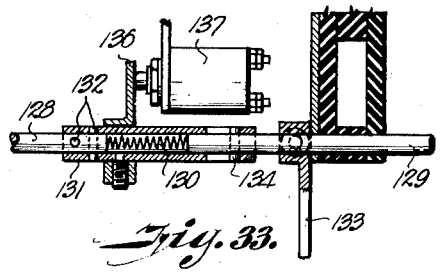

Patented Apr. 21, 1953

2,635,938

UNITED STATES PATENT OFFICE 2,635,938

VENDING MACHINE

Robert B. Whitney, Pittsburg, Kans., and Wayne B. Weed, Kansas City, Mo.; said Weed assignor to said Whitney Application April 8, 1946, Serial No. 660,538

28 Claims. (Cl. 312—46)

This invention relates to improvements in an automatic vending machine and refers more particularly to a machine for vending bottled beverages as individual units when a coin is placed in the machine.

Many different types of vending machines for merchandising bottled goods have been devised. The principal features of such machines include the storage for the bottles, an ice compartment or refrigeration unit for maintaining the beverage at a desired temperature and a feeding mechanism for automatically delivering an individual bottle from the storage space to the customer.

The design of the instant machine is an improvement over what is now used in that it provides a substantially tamperproof construction, one which is easily assembled, has a large capacity, and can be quickly loaded and serviced.

An object, therefore, is to provide an upright cabinet having a full length door which renders the interior of the cabinet easily accessible for loading, replacement or repair.

Another object is to provide a cabinet horizontally separated into compartments in which are located the magazine, a precooling space, a refrigeration unit, and a bottle feeding mechanism, each of the separate units being readily removable from its compartment should repair or replacement be necessary.

Other and further objects of the invention will appear from the following description.

Figure 6:
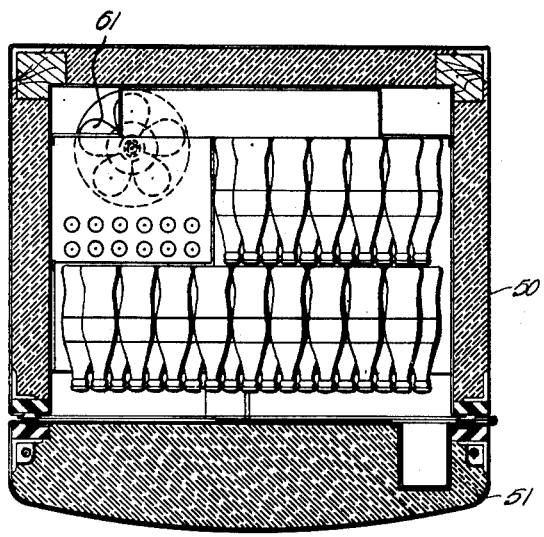
Figure 7:
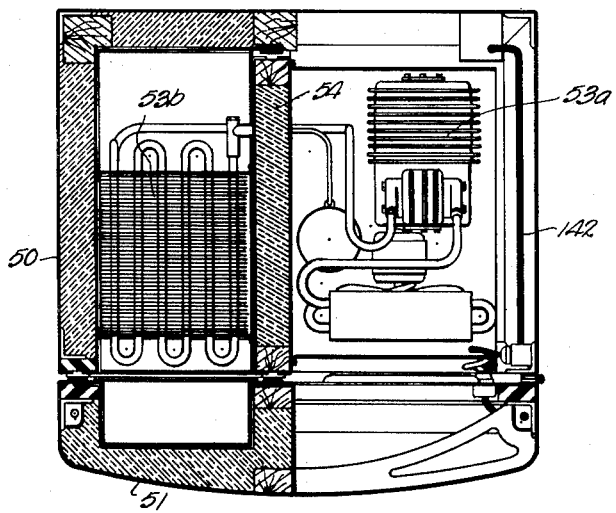
Figure 17:
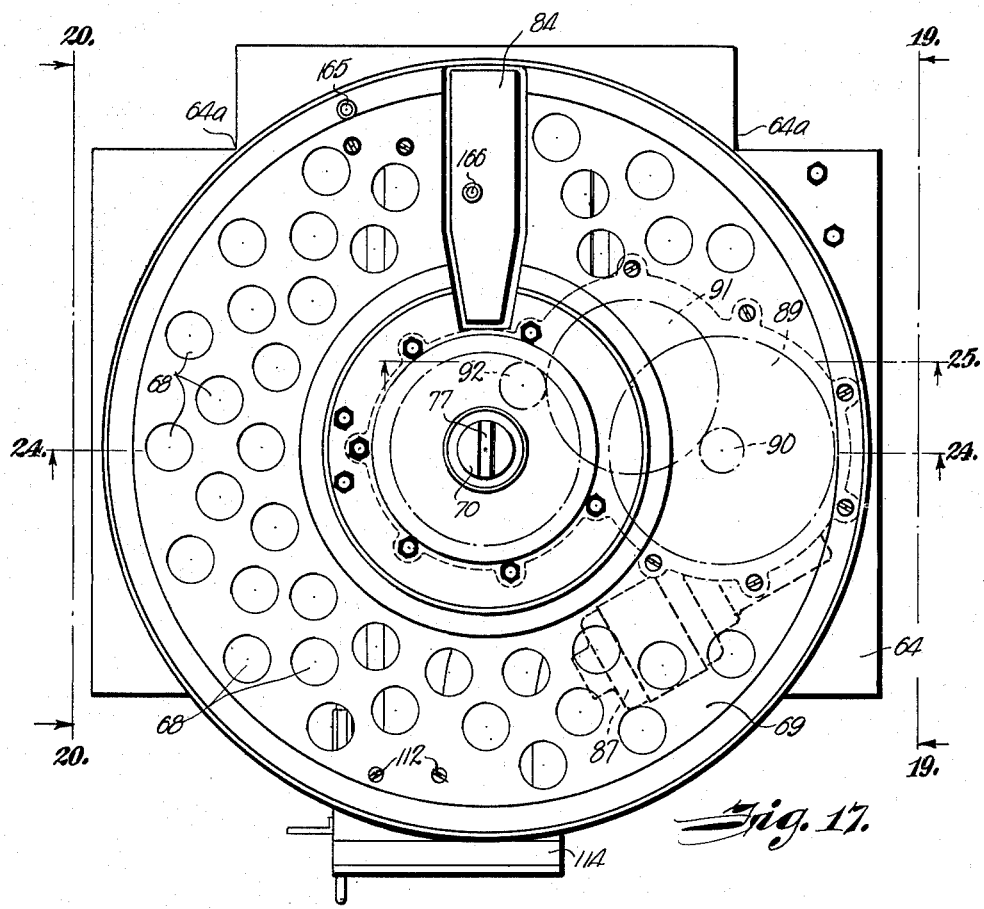
Figure 18:
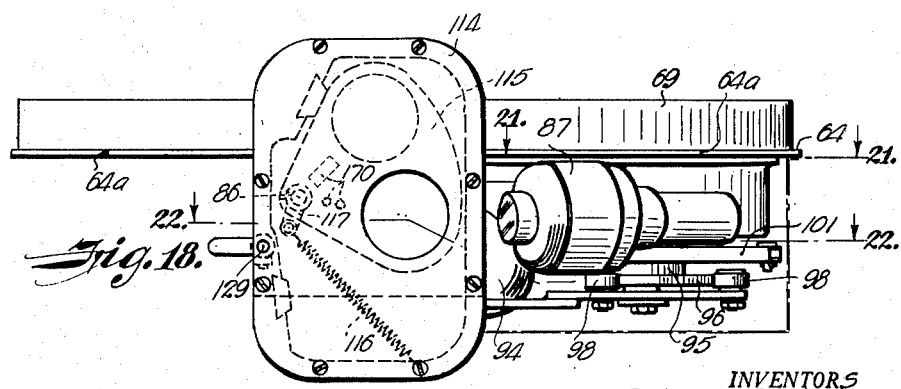
Figure 19:
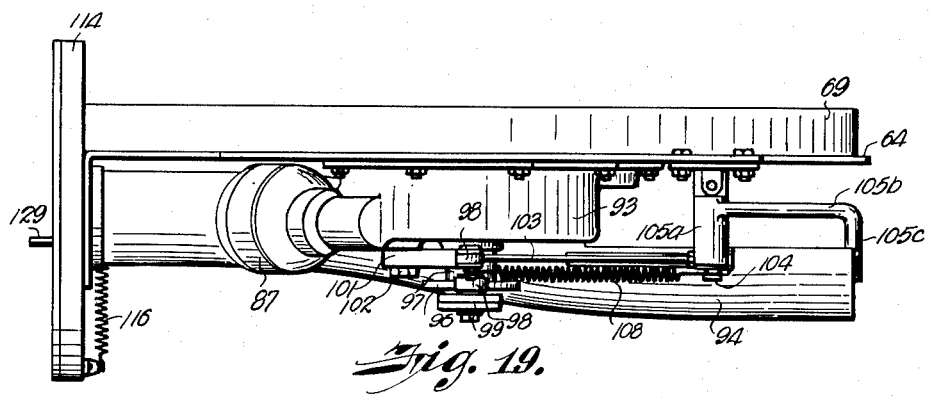
Figure 20:
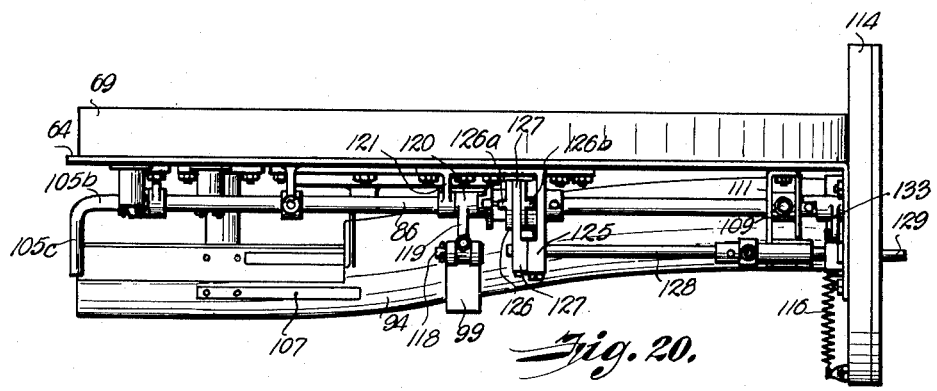
Figure 21:
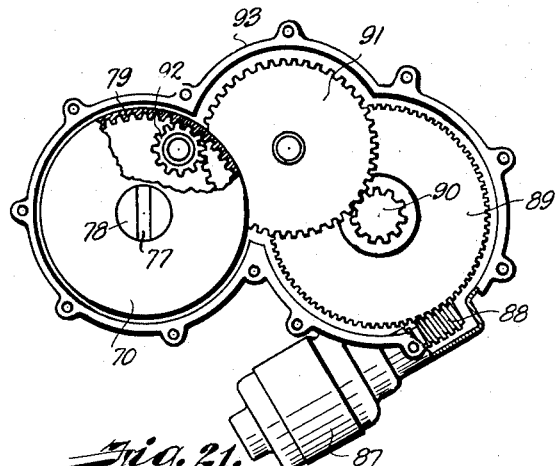
Figure 22:
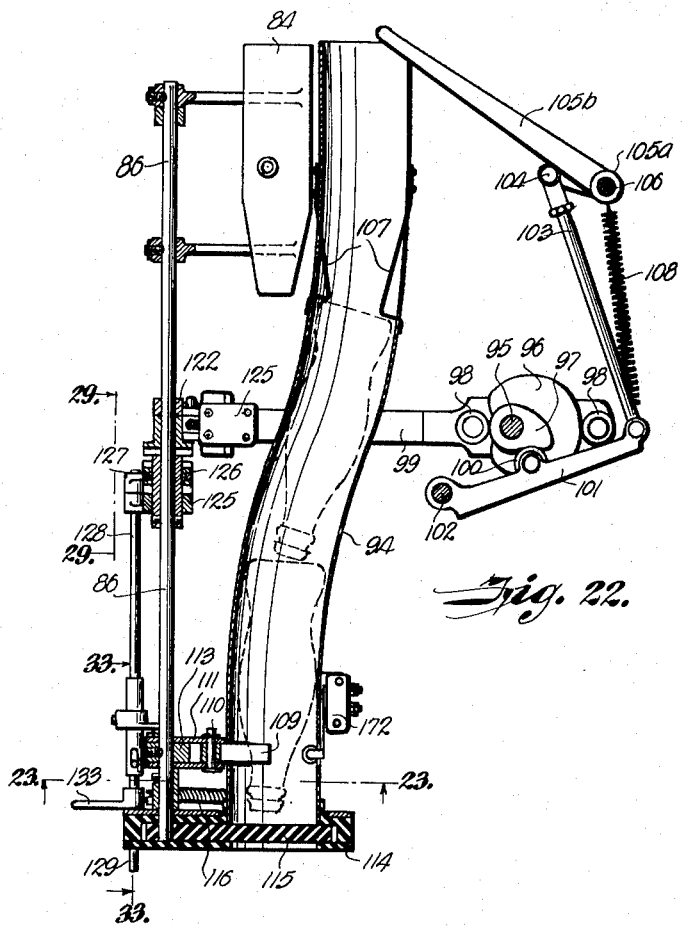
Figure 23:
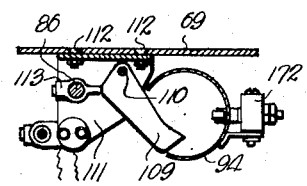
Figure 24:
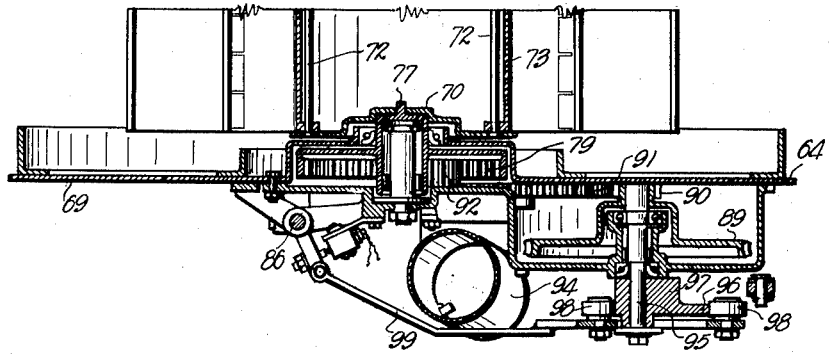
Figure 26:
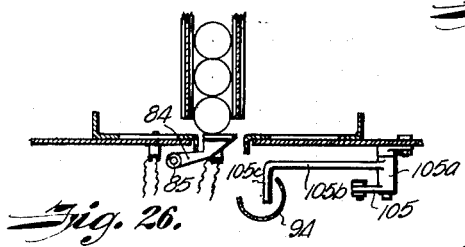
Figure 25:
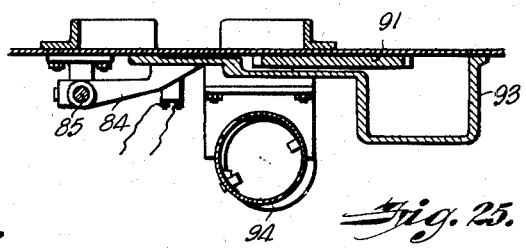
Figure 27:
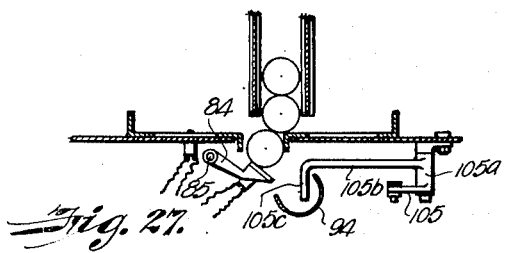
Figure 28:
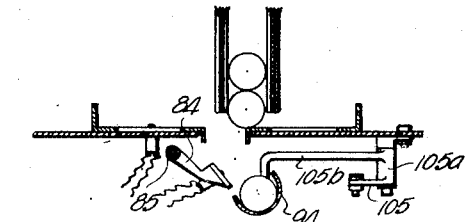

In the accompanying drawings which form a part of the instant specification and are to be read in conjunction therewith and in which like reference numerals indicate like parts in the various views, Fig. 1 is a front elevation of a vending machine embodying the features of the invention with the front door of the cabinet swung open showing the interior arrangement, Fig. 2 is a perspective view of the cabinet with the interior mechanism and front closure removed, Fig. 3 is a face view of the inside of the cabinet door, Fig. 4 is a perspective view of the refrigeration unit removed from its compartment, Fig. 5 is a perspective view of the precooler floor, circulating fan and air duct combination, Fig. 6 is a cross section taken through the lower portion of the machine along the line 6—6 in Fig. 1 in the direction of the arrows, Fig. 7 is a sectional view taken through the cabinet along the line 7—7 in Fig. 1 in the direction of the arrows, Fig. 8 is a section through the cabinet taken along the line 8—8 in Fig. 1 in the direction of the arrows, Fig. 9 is an enlarged partial view of the magazine taken along the line 9—9 in Fig. 1 in the direction of the arrows, Fig. 10 is an enlarged section of the magazine in elevation taken along the line 10—10 in Fig. 9 in the direction of the arrows, Fig. 11 is an enlarged section taken near the top of the door along the line 11—11 in Fig. 1 in the direction of the arrows, Fig. 12 is a sectional view taken along the line 12—12 in Fig. 11 in the direction of the arrows, Fig. 13 is an enlarged longitudinal section taken along the line 13—13 in Fig. 1 in the direction of the arrows and showing the upper pivot point of the magazine, Fig. 14 is a view taken along the line 14—14 in Fig. 1 in the direction of the arrows through the hinge showing the interlock pin, Fig. 15 is a sectional view taken along the line 15—15 in Fig. 14 in the direction of the arrows, Fig. 16 is a schematic wiring diagram of the circuits which are used in the machine, Fig. 17 is a view taken along the line 17—17 in Fig. 1 in the direction of the arrows, Fig. 18 is a front view of the bottle feeding mechanism, Fig. 19 is an elevational view of the right side of the bottle feeder taken along the line 19—19 in Fig. 17 in the direction of the arrows, Fig. 20 is an elevational view of the left side of the bottle feeder taken along the line 20—20 in Fig. 17 in the direction of the arrows, Fig. 21 is a view taken along the line 21—21 in Fig. 18 in the direction of the arrows, Fig. 22 is a view taken along the line 22—22 in Fig. 18 in the direction of the arrows, Fig. 23 is a view taken along the line 23—23 in Fig. 22 in the direction of the arrows, Fig. 24 is a view taken along the line 24—24 in Fig. 17 in the direction of the arrows, Fig. 25 is a view taken along the line 25—25 in Fig. 17 in the direction of the arrows, Figs. 26, 27 and 28 are schematic sections taken through the magazine and bottle feeding mechanism illustrating different stages of the bottle feeding cycle from the time a tier of bottles rests upon the feeder door until the lowest bottle in the tier is deposited into the feeder chute, Fig. 29 is an enlarged view, partially in section, taken along the line 29—29 in Fig. 22 in the directions of the arrows, showing the clutch arrangement for engaging and disengaging the operating shaft for manipulating the bottle feed plate, lock bar and shutter door, Fig. 30 is a view taken along the line 30—30 in Fig. 29 in the direction of the arrows, Fig. 31 is an enlarged isometric view of a sleeve which fits over and is pinned to the bottle-feeding shaft, as indicated in Figs. 29 and 30.

Fig. 32 is a view taken along the line 32—32 in Fig. 29 in the direction of the arrows, and Fig. 33 is a view taken along the line 33—33 in Fig. 22 in the direction of the arrows.

Referring to the drawings at 50 is shown a vertical cabinet heavily insulated to minimize the passage of heat into its interior and loss of refrigerated cooling from the interior of the cabinet to the atmosphere. Hinged to the open front of the cabinet is a closure or door 51 which is likewise heavily insulated and has a strip of resilient packing 52 which fits against the cabinet assuring a seal between the closure and the cabinet when the door is closed. The interior of the cabinet is divided horizontally into separate compartments. The lower compartment contains a refrigeration unit 53 shown in Figs. 1, 4 and 7. This unit consists of a compressor 53a and evaporator 53b, both mounted upon and supported by a heavily insulated vertically partitioned wall 54 located therebetween, shown best in Figs. 4 and 7. The bottom of the partition wall has a channel section shown at 54a in Fig. 4 that slides along an insulating strip 55 fastened to the bottom frame of the cabinet, as indicated in Fig. 2. Near the top of the insulated partition and on the sides supporting the compressor unit is a second channel-shaped slide 54b which bears against an insulation strip 56 along the outer edge of the insulated shelf 57. At the ends of the vertical partition 54 are channel sections 54c and 54d, indicated in Fig. 4. These channels bear against insulating strips on the inside of the door and on the inside rear wall of the cabinet effectively insulating the spaces separated by partition wall 54 from each other. The space within the cabinet enclosing evaporator coils 53b is insulated while the space enclosing compressor unit 53a is ventilated to remove heat generated by the unit.

The bottle precooler storage space or compartment is likewise directly above the refrigeration unit and has a corrugated floor 58, shown in Figs. 1 and 5. Beneath the corrugated floor are transverse supports 59 slidable at one of their ends on a metal ledge 60 and supported and slidable at their opposite ends on shelf 57. The corrugated floor insures correct stacking of the bottles for maximum capacity, cooling efficiency and lessens the danger of bottle breakage in the event the machine is moved. A circulating fan 61, indicated diagrammatically in dotted lines, within housing 62 serves to circulate refrigerated air from the space in which evaporator coils 53b are located upwardly through ducts 62a into the magazine compartment of the cabinet. The corners of the feeder mechanism platform 64 are notched or cut away at the rear, as shown at 64a in Figs. 8 and 17, to accommodate passage of the ducts 62a therethrough. An auxiliary housing 63 perforated at the top provides means for assuring local circulation within the precooler compartment. The circulation of refrigerated air through the cabinet is from the refrigerated space of the lower compartment by means of circulating fan 61, shown in dotted lines in Fig. 6, upwardly through housing 62. In this housing the air travel is further accelerated by fan 61 into duct 62a. These ducts discharge the air behind a substantially circular sheet metal shell 66 surrounding the magazine compartment of the cabinet, as shown in Fig. 2. The upper inner wall of the door is shaped, as shown at 67, to complete the contour of the shell. The shell terminates below the top of the cabinet permitting the cooled air to pass over the top of the shell and be diverted downwardly by the ceiling of the cabinet onto the bottles stacked in the magazine. Circulation through the magazine space is downwardly over the bottles and through perforations 68 provided in the bottle supporting tray 69. From the magazine compartment the air passes downwardly through the precooler and returns around the edges of the corrugated floor to the space in which refrigerating coils 53b are located. In this manner the refrigerated air is circulated when fan 61 is operating.

The bottle magazine compartment containing the filled beverage bottles is probably best shown in Figs. 1, 8, 9 and 10. It is made up of sections to accommodate a layer of 16 bottles arranged radially about a central support. Each section is four bottles in height or has four 16-bottle layers. The size of the cabinet will to a great extent determine the bottle capacity of the magazine. Small machines will have a 64-bottle capacity or one of the magazine sections. The adding of sections increases the capacity to 128 bottles, 192 bottles and 256 bottles, according to the height of the machine.

The magazine consists of a lower drive plate 70 and a top plate 71 held rigidly together by vertical rods 72, best shown in Figs. 8, 9 and 10. Serving as a spacer between the top and bottom plates is a tubular member 73 upon which the plates shoulder. Extending radially from the tubular member are plate separators 74 located to separate the layers of bottles into individual tiers or stacks. Lateral projections 74a extending from the sides of the separators contact the surfaces of the bottles more firmly and hold them in better vertical alignment. U-shaped springs 75 grip the necks of the bottles and hold them from lateral movement. These springs are slotted to permit separate deflection of the individual bottles. Aligning lugs 76 are interposed in holding rods 72 of the bottle magazine sections.

The bottle supporting tray 69 has an upstanding rim, shown best in Fig. 1. Bottom drive plate 70 of the magazine has a central slotted aperture to accommodate key 77 on hub 78 of internal gear 79 which form a part of the feeder unit mechanism, shown in Fig. 21. Into a central aperture in the top plate 71 of the magazine is fitted a hollow pivot pin 80, detailed in Fig. 13. The threaded upper end of the pivot pin is screwed into plate 81 riveted to the shell of the magazine compartment until a shoulder formed on the pin abuts the surface of the plate. The pivot pin is provided with a handle 82 which facilitates tightening or loosening the pin in the holding plate. The periphery of the lower end of the pivot pin is grooved to receive the circular split spring 83 which prevents displacement of the pivot pin when the magazine has been removed from the cabinet.

The vending operation is performed by rotation of the magazine until one of the stacks or tiers of bottles, as shown in Fig. 10, is located above bottle feeder plate 84, shown in Figs. 17 and 22, while its functioning is diagrammatically indicated in Figs. 26, 27 and 28. The feeder plate is pivoted at 85 upon shaft 86 located beneath the bottle supporting tray 69, positioned above the feeder mechanism platform 64. The magazine or stacks of bottles are rotated by the driving mechanism shown in Fig. 21. Motor 87 drives worm 88 from which power is transmitted through gear 89, pinion 90 to gear 91. Gear 91 drives pinion 92 which is also meshed with the internal gear 79. This entire train of gears is enclosed within a housing 93 located below and is bolted to the feeder mechanism platform 64 and bottle supporting tray 69. Rotative energy is transmitted from internal gear 79 through hub 78 to the lower drive plate 70 of the magazine.

Operation of motor 87 and rotation of the magazine is controlled by an electric circuit, shown in Fig. 16, hereinafter described. When a coin has been placed in the machine the motor circuit is closed by a switch and the magazine is rotated until a stack of the bottles moves to a position where it is supported by the feeder plate 84, as shown in Fig. 26. At this time the feeder plate is tripped, as indicated in Fig. 27, and the magazine continues to rotate so the lower bottle of the stack drops through the aperture in the bottle supporting tray 69 being deposited into the open side of a chute 94, as shown in Fig. 28.

Pinion 90 which transmits rotative energy from motor 87 to the magazine is fixedly mounted at the top of a vertical shaft 95, shown in Fig. 24. The lower part of this shaft carries a double cam arrangement, designated as 96 and 97, in Figs. 22 and 24. The lower cam 96 operates between cam rollers 98 on cam bar 99. The upper cam 97 operates against roller 100 carried by a lever 101 pivoted at 102 to casing 93, as shown in Figs. 19 and 22. At the opposite end of arm 101 is connected an adjustable link 103. This link is pivoted at 104 to a short arm 105 extending radially from sleeve 105a, shown in Figs. 19, 22 and 26–28 inclusive. The bottle feeder arm 105b also extends radially from the sleeve and has a bent extremity 105c which abuts the bottom of the bottles when they are fed forwardly through the delivery tube 94. Sleeve 105a is rotatably mounted upon a pin 106 depending from a plate which is bolted to the feeder mechanism platform.

Rotation of cam 96 is synchronized with the feeder plate 84 so bottles discharged into the rear of the delivery tube are advanced by the feeder arm when a coin is placed in the machine. The delivery tube shown accommodates 3 bottles, as indicated in Fig. 22. The rear bottle, not shown, is delivered from the magazine by the feeder plate. The bottle in the forward end of the tube is the next bottle delivered to the customer. An intermediate bottle, indicated in dotted lines in Fig. 22, serves to advance the bottle about to be vended when the feeder arm 105b pushes the rear bottle forwardly. Within the tube adjacent the neck of the rear bottle are leaf springs 107 attached to the tube at their rear ends and arranged to permit forward travel of the bottles delivered to the tube from the feeder plate but shaped to prevent rearward movement of a bottle after it has passed through the spring. Thus a bottle is permitted to pass by spreading of the springs but is effectively stopped from rearward movement in the tube after it has passed the springs. A coil spring 108 returns feeder arm 105b to the position shown in Fig. 22 after it has been actuated by cam 97.

Engaging the neck of the front bottle or the bottle about to be vended is a stop 109, shown in Figs. 22 and 23. The stop is pivoted upon a pin 110 carried by a bracket 111 fastened beneath bottle supporting disk 69 by screw bolts 112. The stop is actuated by a cam 113 fixedly mounted upon shaft 86 and synchronized with the feeder plate 84 and feeder arm 85 to release the bottle neck when the feeder arm is actuated and clamp the bottle neck after the front bottle has been vended.

To permit delivery of the bottle through a circular aperture in the door of the cabinet there is provided a shutter mechanism enclosed within a housing 114, shown in Figs. 1, 3 and 17–20 inclusive. The shutter 115 has a somewhat triangular shape pivoted near its apex on shaft 86. The shutter is actuated to its open and closed positions by oscillation of shaft 86 upon which it is mounted. Its functioning is timed with the feeder plate 84 and feeder arm 105b to move the shutter to an open position when a bottle is advanced during the vending cycle and moved to a closed position after a bottle has been dispensed. In the position shown in Fig. 18 the shutter is closed. It is positively actuated in opening by the contacting of a pin on shaft 86 with a lug on the lever arm of the shutter to which spring 116 is attached. Coil spring 116 maintains rotative tension through arm 117 upon the shutter and returns the shutter to its closed position after it has been opened.

The actuation of shaft 86 in the dispensing or vending cycle is dependent upon rotation of cam 96 and reciprocation of cam bar 99 caused by rotation of rolls 98 along the cam surface. Cam bar 99 has a bifurcated end which is pinned at 118 to thrust lever 119 of clutch member 120, shown best in Figs. 20, 22, 29 and 30. Clutch member 120 is rotatably mounted on shaft 86 and abuts a rear hanger 121 of a bracket which supports the shaft. A sleeve 122 is pinned at 123 to shaft 86 and bears in a boss 124 formed on the rear side of hanger 125. The rear end of the sleeve extending beyond the boss is square-shaped in cross section, as detailed in Fig. 31. Mounted upon the squared portion is a double-ended dog clutch 126. In a groove in the central portion of the dog bears the shifting fork 127. The lower end of the fork is rigidly secured to the clutch shifter shaft 128 which is supported at this point by an extension of hanger 125. Clutch dog 126 has lugs 126a which extend rearwardly and fit slots 120a of clutch member 120. The shiftable dog 126 also has lugs 126b extending from its forward surface which engage slots 124a in the boss 124 on hanger 125. To shift the dog into engagement with clutch member 120 it is only necessary to close the cabinet door. When this is done plunger 129, shown in Figs. 1, 18, 20 and 22 and detailed in Fig. 33, is forced in imposing a compressive force on spring 130 and retracting sleeve 131 which surrounds the spring and shifter shaft 128 which is pinned to the sleeve at 132. Movement of the shifter shaft rearwardly causes the shifter fork 127 to slide the double ended dog 126 along the squared end of sleeve 122 to engagement with slots 120a of clutch member 120. It will be noted that lugs 126b are not completely withdrawn from the slots in the boss 124 until lugs 126a enter slots 120a of clutch member 120. When the dog is shifted rearwardly into engagement with the clutch member the bottle feeding mechanism is adjusted for operation in the vending or dispensing cycle. Actuation of shaft 86 which manipulates feeder plate 84, and stop 109, is from motor 87 through worm 88 and the transmission gears to shaft 95. Upon the shaft is mounted cam 96 which operates feeder arm 105b and pinion 90 which transmits rotative energy through a train of gears to the magazine. For each complete or 360° rotation of shaft 95 the magazine is moved through an angle of 22½°.

Cam 97 on this same shaft reciprocates cam arm 99 which, through clutch member 120 and dog 126, transmits the oscillatory movement of the cam arm to shaft 86. As previously suggested shaft 86 operates the feeder plate 84 and bottle stop 109.

To load the magazine it is desirable to disconnect the dispensing feed. This is accomplished by opening the cabinet door and pulling forward handle 133 affixed to plunger 129, shown best in Figs. 22 and 33. The rear end of the plunger is attached to sleeve 130 by a cross pin 134 which slides in slots in the sleeve. Since the sleeve is also attached to shifter shaft 128 this shaft is moved forwardly. The fork 127 at the opposite end of the shaft moves the double-faced dog 126 out of engagement with clutch member 120 and into engagement with the slots 124a in boss 124 thus locking the feeder plate 84 closed. The dog and shifter mechanism is held in this position by a spring-urged ball 135 below the shaft fitting a depression in the periphery of the shaft. The ball and spring are contained in a hole drilled in the bottom of the extension of bracket 125, shown in Fig. 29.

When the dog 126 is disengaged from the clutch member, shaft 86 runs free within the clutch member and is no longer oscillated by cam arm 99. The magazine in which the bottles are stacked, shown in Figs. 8 and 10, is rotated along through the train of gears, shown in Fig. 21, by motor 87. The motor is automatically started during this loading cycle when the shifter mechanism is pulled forward by handle 133 since arm 136, mounted upon sleeve 131, actuates switch 137 in the motor circuit. As the magazine rotates the bottles are loaded.

After the loading operation has been completed to put the cabinet back into vending condition it is only necessary to close the cabinet door since this moves the shifter shaft rearwardly and reengages clutch 126 with clutch member 127. At the same time arm 36 releases a switch and opens a circuit which drives the motor during the loading cycle.

The electrical circuits are diagrammatically shown in Fig. 16. This electrical system gives the cabinet a maximum protection with the least amount of equipment and complication. The circuits are designed to guarantee the customer a bottle of beverage if his coin is accepted by the machine. The circuits contain seven mechanical switches, two thermo switches and three electrical relay switches. The incoming power lines 138 receive energy from any convenient electrical power source by connecting plug 139 to a convenient socket. Interposed in conductors 138 is a heater-type breaker switch 140. Connected to the breaker switch is a conductor 141 which leads to the motor of the refrigeration unit, indicated diagrammatically at 142 in Fig. 7. Conductor 141a which is the diversionary wire from 141, goes to the motor which drives the air circulating fan 61. Wire 144, also having connection through wire 145 with the breaker switch, leads to a narrow range thermostat switch 146. Wire leads 147 and 148 from the thermostat switch to the motor of the refrigeration unit 143 and the motor for fan 61 cut the fan and refrigeration unit on and off within the narrow ranges established by the switch. Also the circulating fan operates before the refrigerating unit and if the evaporating coils 53b are able to absorb additional heat the temperature will remain down and keep the refrigeration unit out of operation until cooling air is absolutely required. This adds greatly to the economy of the machine. Wire 149, which is a lead from conductor 145, connects coin switch 150 through conductor 151 to a ratchet-type motor switch relay 152. Relay 152 de-energizes the ratchet-type stop switch relay 153 when shifter mechanism motor 87 is energized through a circuit consisting of wires 145, 154, switch 155, and conductors 156 and 157. At the same time relay 152 energizes coin rejector and empty light switch 158 through the circuit made up of conductors and switches 154, 159, 160 and 161. The empty light 162 receives electrical energy via wires 161, 163 and 164. If both stack switches 165 and 166 are closed, which occurs when the magazine is empty, the coin rejector and empty light switch 158 is energized through wires 167, 168, 169 and 161, the latter wire communicating to the opposite pole of breaker switch 140. If the door switch 170 is closed, which occurs when the shutter door is open, the coin rejector and empty light switch relay 158 are energized through wires 170a, 171 and conductor 161.

When a bottle is being vended through the delivery tube 94, bottle switch 172 is closed and the ratchet-type stop switch relay 153 is energized through conductors 173, 174 and 175. As the bottle is vended it actuates the stop switch. When the feeder door 84 closes stop switch 176, energized by stop switch relay 153 through wires 177 and 178, is actuated and energizes motor switch relay 152. The energizing of this motor switch relay opens the circuit to the motor 50 simultaneously de-energizing coin rejector and empty light switch 158.

Load switch 137 is interposed between the conductor 156 and wire 145 connected to a tap of the breaker switch. Closing of this load switch energizes the motor for loading the bottle magazine.

As shown in Figs. 2 and 3, the full length cabinet door 51 has an outer and inner skin with suitable insulation therebetween. On the inside edge of the door is a hinge bar 179 at the top and bottom of which are hinge pins or pintles 180. On the cabinet is a hinge bar 181 to which are affixed eyes or socket fixtures 182 into which the hinge pins 180 fit. Hinge bar 179 in the door has three holes 183 into which pins 184 fit. When the door is closed the pins register and fit into the holes preventing the door from being taken off its hinges when closed. When open it may be removed from the cabinet by simply lifting the hinge pins from their socket fixture. To lock the door there are attached to the door jamb on the opposite side of the cabinet two door-strike angles 185 located to fit into slotted holes 186 in the outer edge of the door, shown in Figs. 2, 3, 11 and 12. Holes in the angles 185 receive the ends of locking bar 187. This locking bar is preferably in two parts, one-half above the lock and the other below. By a camming arrangement, not shown, at the lock the upper locking bar is raised and the lower locking bar lowered to engage the strike angles to fasten the door in a closed position. The lock is turned by means of a suitable key which is removable in order that the cabinet cannot be tampered with. To lock the door of the cabinet it is closed then the removable lock handle or key is inserted in the lock and the key turned to move locking bars 187 to engagement with the striker plates.

On the outside of the door is a coin slot and adjacent thereto an empty light and a rejected coin receptacle which are conventional with this type cabinet. A hole through the door, as indicated in Fig. 3, is located at the end of delivery chute 94 and is opened and closed by shutter 115. It is through this hole that the bottled beverage is delivered and retrieved by the customer. The cabinet door has a compartment enclosed by cover plate 188, shown in Fig. 3, containing electrical relay and coin receiving and rejecting mechanism. A drawer-type coin box is enclosed within cover plate 189. A bottle cap disposal compartment is provided within closure 190. The thermostat arrangement of the cabinet is shown diagrammatically at 191 on the inside of the door. An electric outlet 192 serves as a connection for energizing the electrical equipment in the cabinet door. An access panel 193 permits repairs and adjustment to the door lock. Panel 194 surrounding the delivery aperture is recessed to accommodate the shutter door housing, shown in Fig. 22. Around the delivery aperture is gasket 195 which forms a seal between the housing and the cabinet door when the door is closed. Louvers 196 in the lower part of the door which encloses the refrigeration unit permit air to be circulated through the compartment which the unit occupies.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described our invention, we claim:

1. In a vending machine, a cabinet having a door, a horizontal shelf removably mounted on the inside of said cabinet, motor driven mechanism carried on the underside of said shelf with a drive shaft extending upwardly through the shelf, a bottle magazine supported above the shelf and connected to said drive shaft for rotation about a vertical axis, said magazine comprising a plurality of vertical channels arranged in a circle about said axis, each channel adapted to receive a plurality of bottles stacked one upon another with their axes horizontal, the bottle on the bottom of each stack normally resting on said shelf, a trough under the shelf and supported thereby, said shelf having an aperture with which said channels register successively as said magazine is rotated whereby bottles can pass through said aperture into said trough, said magazine comprising a unitary structure disconnectible from said drive shaft and having an upper bearing detachably mounted on the ceiling of said cabinet to facilitate removal of the magazine from the cabinet.

2. In a vending machine, a cabinet having a door, a horizontal shelf removably mounted on the inside of said cabinet, motor driven mechanism carried on the underside of said shelf with a drive shaft extending upwardly through the shelf, a bottle magazine supported above the shelf and connected to said drive shaft for rotation about a vertical axis, said magazine comprising a plurality of vertical channels arranged in a circle about said axis, each channel adapted to receive a plurality of bottles stacked one upon another with their axes horizontal, the bottle on the bottom of each stack normally resting on said shelf, a trough under the shelf and supported thereby, said shelf having an aperture with which said channels register successively as said magazine is rotated whereby bottles can pass through said aperture into said trough, said magazine comprising a unitary structure disconnectible from said drive shaft and having an upper bearing assembly detachably mounted on the ceiling of said cabinet, said bearing assembly including a stub post aligned with said vertical axis and telescopingly received in the upper end of said magazine, the upper end of said post having a screw threaded connection to the ceiling of the cabinet.

3. In a vending machine, a cabinet having a door with an aperture therein, a horizontal shelf removably mounted on the inside of said cabinet, motor driven mechanism carried on the underside of said shelf with a drive shaft extending upwardly through the shelf, a bottle magazine supported above the shelf and connected to said drive shaft for rotation about a vertical axis, said magazine comprising a plurality of vertical channels arranged in a circle about said axis, each channel adapted to receive a plurality of bottles stacked one upon another with their axes horizontal, the bottle on the bottom of each stack normally resting on said shelf, a trough under the shelf and supported thereby, said shelf having an aperture with which said channels register successively as said magazine is rotated whereby bottles can pass through said aperture into said trough, a discharge tube connecting said trough with said aperture in the door of the cabinet, a closure for the aperture in the shelf, means operated by said drive mechanism for periodically opening said closure in timed relation to the rotation of said magazine, and other means periodically operated by said mechanism for propelling bottles in said trough toward said discharge tube and thence through the aperture in the door.

4. A vending machine as in claim 3 having a barrier in the tube blocking the path of the bottles, and means connected to and operated by said drive mechanism for periodically removing said barrier in timed relation to the feeding of the bottles into the trough.

5. In a bottle vending machine, a bottle magazine rotatable about a vertical axis, said magazine comprising a plurality of vertical channels arranged in a circle about said axis, each channel adapted to receive a plurality of bottles stacked one upon another with their axes horizontal, a stationary horizontal plate under the magazine having an aperture registering with one of said stacks, the bottom bottle of each of the remaining stacks resting on said plate, means for turning said magazine about its axis to bring the stacks successively into register with said aperture, a closure for the aperture, said closure being flush with said plate and effective to receive and support the bottom bottle of each stack as that stack is brought into register with the aperture, and mechanism synchronized with the rotation of the magazine operative to withdraw said closure as each stack moves out of register with said aperture whereby the bottom bottle is permitted to pass through said aperture while said plate blocks the path of the next bottle in the stack.

6. A machine as in claim 5 having a single prime mover operatively connected to said magazine-turning means and said mechanism to actuate both.

7. In a bottle vending machine, a bottle magazine rotatable about a vertical axis, said magazine comprising a plurality of vertical channels arranged in a circle about said axis, each channel adapted to receive a plurality of bottles stacked one upon another with their axes horizontal, a stationary horizontal plate under the magazine having an aperture registering with one of said stacks, the bottom bottle of each of the remaining stacks resting upon said plate, means for turning said magazine about its axis to bring the stacks successively into register with said aperture, said last means including a motor and a circuit for operating the motor intermittently, a closure for said aperture effective to receive and support the bottom bottle of each stack as that stack is brought into register with the aperture, mechanism for withdrawing said closure, a clutch normally coupling said mechanism with said magazine-turning means to withdraw said closure as each stack moves out of register with said aperture whereby the bottom bottle is permitted to pass through said aperture while said plate blocks the path of the next bottle in the stack, means for disengaging said clutch, and a circuit controlled by said last means for rendering said motor continuously operative while the clutch is disengaged.

8. In a bottle vending machine, a cabinet having a door, a bottle magazine in the cabinet rotatable about a vertical axis, said magazine comprising a plurality of vertical channels arranged in a circle about said axis, each channel adapted to receive a plurality of bottles stacked one upon another with their axes horizontal, a stationary horizontal plate under the magazine having an aperture registering with one of said stacks, the bottom bottle of each of the remaining stacks resting on said plate, means for turning said magazine about its axis to bring the stacks successively into register with said aperture, a closure for the aperture effective to receive and support the bottom bottle of each stack as that stack is brought into register with the aperture, mechanism synchronized with the rotation of the magazine operative to withdraw said closure as each stack moves out of register with said aperture whereby the bottom bottle is permitted to pass through said aperture while said plate blocks the path of the next bottle in the stack, and means for disabling said mechanism when the door of said cabinet is open.

9. In a bottle vending machine, a cabinet having a door, a bottle magazine in the cabinet rotatable about a vertical axis, said magazine comprising a plurality of vertical channels arranged in a circle about said axis, each channel adapted to receive a plurality of bottles stacked one upon another with their axes horizontal, a stationary horizontal plate under the magazine having an aperture registering with one of said stacks, the bottom bottle of each of the remaining stacks resting on said plate, means for turning said magazine about its axis to bring the stacks successively into register with said aperture, a closure for the aperture effective to receive and support the bottom bottle of each stack as that stack is brought into register with the aperture, mechanism for withdrawing said closure, a clutch normally linking said mechanism to said magazine-turning means to withdraw the closure as each stack moves out of register with said aperture whereby the bottom bottle is permitted to pass through said aperture while said plate blocks the path of the next bottle in the stack, and means for actuating said clutch under control of the door of said cabinet.

10. In a bottle vending machine, a bottle magazine rotatable about a vertical axis, said magazine comprising a plurality of vertical channels arranged in a circle about said axis, each channel adapted to receive a plurality of bottles stacked one upon another with their axes horizontal, a stationary horizontal plate under the magazine having an aperture registering with one of said stacks, the bottom bottle of each of the remaining stacks resting upon said plate, means for turning said magazine about its axis to bring the stacks successively into register with said aperture, a gate normally closing said aperture to receive and support the bottom bottle of each stack as that stack is brought into register with the aperture, a trough below said plate and spaced laterally to one side of said aperture, mechanism synchronized with the rotation of the magazine and operative to incline said gate downwardly toward said trough as each stack moves out of register with said aperture whereby the bottom bottle is lowered through said aperture and rolled into said trough while said plate blocks the path of the next bottle in the stack.

11. In a bottle vending machine, a bottle magazine rotatable about a vertical axis, said magazine comprising a plurality of vertical channels arranged in a circle about said axis, each channel adapted to receive a plurality of bottles stacked one upon another with their axes horizontal, a stationary horizontal plate under the magazine having an aperture registering with one of said stacks, the bottom bottle of each of the remaining stacks resting upon said plate, means for turning said magazine about its axis to bring the stacks successively into register with said aperture, a gate normally closing said aperture to receive and support the bottom bottle of each stack as that stack is brought into register with the aperture, a trough below said plate and spaced laterally to one side of said aperture, mechanism synchronized with the rotation of the magazine and operative to incline said gate downwardly toward said trough as each stack moves out of register with said aperture whereby the bottom bottle is lowered through said aperture and rolled into said trough while said plate blocks the path of the next bottle in the stack, a delivery tube aligned with said trough, and other mechanism synchronized with the rotation of the magazine and operative to advance each bottle received in said trough axially along the trough and into said tube prior to said gate's admission of the next bottle to the trough.

12. A machine as in claim 11 having means preventing retrograde movement of the bottle from said tube into said trough.

13. A machine as in claim 11 having a barrier in the tube to prevent a bottle therein from advancing beyond a predetermined point, and means for withdrawing said barrier in timed relation to the operation of said advancing mechanism.

14. A machine as in claim 11 having a single prime mover operatively connected to both of said mechanisms and also to said magazine-turning means to actuate same.

15. A machine as in claim 11 enclosed in a cabinet having a door, a prime mover operatively connected to said magazine-turning means, a clutch normally connecting both of said mechanisms to said prime mover for operation thereby, and means controlled by the door of the cabinet for actuating said clutch.

16. In a bottle vending machine, a cabinet having a door, a bottle magazine in the cabinet rotatable about a vertical axis, said magazine comprising a plurality of vertical channels arranged in a circle about said axis, each channel adapted to receive a plurality of bottles stacked one upon another with their axes horizontal, a stationary horizontal plate under the magazine having an aperture registering with one of said stacks, the bottom bottle in each of the remaining stacks resting on said plate, means for turning said magazine about its axis to bring the stacks successively into register with said aperture, a closure for the aperture effective to receive and support the bottom bottle in each stack as that stack is brought into register with the aperture, mechanism for withdrawing said closure, a clutch normally linking said mechanism to said magazine-turning means to withdraw the closure as each stack moves out of register with said aperture whereby the bottom bottle is permitted to pass through the aperture while said plate blocks the path of the next bottle in the stack, means for disengaging the clutch when said cabinet door is open thereby to permit rotation of said magazine independently of said closure-withdrawing mechanism to facilitate loading the magazine with bottles, said last means being controlled by said door and actuated thereby to re-engage said clutch responsive to the closing of said door.

17. A vending machine as in claim 16 having a lock operated under control of said last means to positively prevent withdrawal of said closure whenever said clutch is disengaged.

18. In a bottle vending machine, a cabinet having a door, a bottle magazine in the cabinet rotatable about a vertical axis, said magazine comprising a plurality of vertical channels arranged in a circle about said axis, each channel adapted to receive a plurality of bottles stacked one upon another with their axes horizontal, a stationary horizontal plate under the magazine having an aperture registering with one of said stacks, the bottom bottle in each of the remaining stacks resting on said plate, means for turning said magazine about its axis to bring the stacks successively into register with said aperture, a closure for the aperture effective to receive and support the bottom bottle in each stack as that stack is brought into register with the aperture, mechanism for withdrawing said closure, a clutch normally linking said mechanism to said magazine-turning means to withdraw the closure as each stack moves out of register with said aperture whereby the bottom bottle is permitted to pass through the aperture while said plate blocks the path of the next bottle in the stack, a manually operable device for disengaging said clutch, said device being located within said cabinet behind the door thereof when the latter is closed whereby it is accessible for operation to disengage said clutch only when the cabinet door is open, and means automatically actuated by the door upon closing thereof to re-engage the clutch.

19. In a bottle vending machine, a cabinet having a door, a bottle magazine in said cabinet rotatable about a vertical axis, said magazine comprising a plurality of vertical channels arranged in a circle about said axis, each channel adapted to receive a plurality of bottles stacked one upon another with their axes horizontal, a stationary plate under the magazine having an aperture registering with one of said stacks, the bottom bottle of each of the remaining stacks resting upon said plate, means for turning said magazine about its axis to bring the stacks successively into register with said aperture, said last means including a motor and a circuit for operating the motor intermittently, a closure for said aperture effective to receive and support the bottom bottle of each stack as that stack is brought into register with the aperture, mechanism for withdrawing said closure, a clutch normally coupling said mechanism with said magazine-turning means to withdraw said closure as each stack moves out of register with said aperture whereby the bottom bottle is permitted to pass through said aperture while said plate blocks the path of the next bottle in the stack, a manually operable device for disengaging said clutch, said device being located within said cabinet behind the door thereof when the latter is closed whereby it is accessible for operation to disengage said clutch only when the cabinet door is open, a circuit controlled by said device for rendering said motor continuously operative while said clutch is disengaged, and means automatically actuated by the door upon closing thereof to re-engage said clutch and disable said last circuit.

20. In a bottle vending machine, a stationary horizontal shelf, a bottle magazine supported above the shelf and rotatable about a vertical axis, said magazine comprising a plurality of vertical channels arranged in a circle about said axis, each channel adapted to receive a plurality of bottles stacked one upon another with their axes horizontal, the bottom bottle in each stack normally resting on said shelf, drive mechanism for turning said magazine about its axis, said shelf having an aperture with which said channels register successively as said magazine is rotated, a closure for said aperture, means operated by said drive mechanism for periodically opening said closure in timed relation to the rotation of the magazine to permit the bottom bottle in each stack to descend through said aperture as the stacks register successively with the aperture, a generally horizontal trough below the aperture to receive each bottle as it descends therethrough, and other means operated periodically by said mechanism for engaging each bottle when it has been deposited in said trough and moving same along the trough away from the point below the aperture at which the bottle was deposited.

21. In a bottle vending machine, a cabinet having a stationary horizontal shelf therein, a bottle magazine supported above the shelf and rotatable about a vertical axis, said magazine comprising a plurality of vertical channels arranged in a circle about an axis, each channel adapted to receive a plurality of bottles stacked one upon another with their axes horizontal, the bottom bottle in each stack normally resting on said shelf, drive mechanism for turning said magazine about its axis, said shelf having an aperture with which said channels register successively as said magazine is rotated, a closure for said aperture, means operated by said drive mechanism for periodically opening said closure in timed relation to the rotation of the magazine to permit the bottom bottle in each stack to descend through said aperture as the stacks register successively with the aperture, a generally horizontal trough below the aperture to receive each bottle as it descends therethrough, a discharge tube extending from said trough to an aperture in the side wall of the cabinet, other means operated periodically by said drive mechanism for propelling bottles from said trough into said discharge tube and toward said last aperture, a barrier in the tube blocking the path of the bottles, and means connected to and operated by said drive mechanism for periodically removing said barrier in timed relation to the feeding of the bottles into the trough.

22. In a bottle vending machine, a bottle magazine having a vertically elongated compartment for receiving a plurality of bottles stacked one upon another with their axes horizontal, said compartment having uprights on either side of the stack for holding the bottles in superposed relation, dispensing means associated with said magazine and operative to periodically discharge the bottom bottle from said stack whereby the bottles remaining in the compartment advance downwardly therein upon each discharging operation, said compartment being open on one vertical side to facilitate advancing bottles axially and horizontally into said compartment to replenish said stack, said compartment containing a pair of vertically elongated spring members substantially coterminous with said uprights, said members supported adjacent the respective uprights in a position to be deflected away from one another by a bottle advanced horizontally therebetween, whereby the members are tensioned against the sides of the bottle to resist retrograde horizontal movement thereof while permitting the bottle to descend in the compartment as the bottles below are discharged by said dispensing means.

23. In a bottle vending machine, a bottle magazine having a vertically elongated compartment for receiving a plurality of bottles stacked one upon another with their axes horizontal, said compartment having uprights on either side of the stack for holding the bottles in superposed relation, dispensing means associated with said magazine and operative to periodically discharge the bottom bottle from said stack whereby the bottles remaining in the compartment advance downwardly therein upon each discharging operation, said compartment being open on one vertical side to facilitate advancing bottles axially and horizontally into said compartment to replenish said stack, said compartment containing a pair of vertically elongated spring members substantially coterminous with said uprights, said members supported adjacent the respective uprights in a position to be deflected away from one another by a bottle advanced horizontally therebetween, whereby the members are tensioned against the sides of the bottle to resist retrograde horizontal movement thereof while permitting the bottle to descend in the compartment as the bottles below are discharged by said dispensing means, said members comprising vertical spring strips canted so they converge toward one another in the direction of movement of said bottles when same are advanced horizontally into said compartment, the outermost edges of the respective strips being relatively fixed and the innermost edges being free to deflect outwardly when engaged by the bottles.

24. A machine as in claim 23, wherein each of said strips is slit horizontally inward from its free edge at intervals along the length of the latter to form a series of independently flexible tabs.

25. A machine as in claim 24, wherein the vertical spacing between adjacent slits is substantially equal to the vertical spacing between centers of adjacent bottles in said stack.

26. In a bottle vending machine, a bottle magazine having a vertically elongated compartment for receiving a plurality of bottles stacked one upon another with their axes horizontal, said compartment having uprights on either side of the stack for holding the bottles in superposed relation, dispensing means associated with said magazine and operative to periodically discharge the bottom bottle from said stack, whereby the bottles remaining in the compartment advance downwardly therein upon each discharge operation, said compartment being open on one vertical side to facilitate advancing bottles axially and horizontally into said compartment to replenish said stack, said compartment having opposite said open side a vertical channel adapted to receive the leading end of each bottle thus advanced horizontally into said compartment, said channel being substantially coterminous with said uprights and being formed of resilient sheet metal, the opposite longitudinal edges of the channel being turned inwardly and back to form integral spring lips converging from both sides of the mouth of the channel toward the base thereof to yieldably engage opposite sides of each bottle as it is advanced axially and horizontally into said compartment, thereby to resist retrograde horizontal movement of the bottle while permitting the bottle to move vertically downward in the channel as the bottles below are discharged by said dispensing means.

27. A bottle magazine as in claim 26, wherein each of said lips is slit inwardly from the free edge thereof at spaced intervals along said edge, thereby to divide the lip into a series of independently flexible tabs.

28. A bottle magazine as in claim 27, wherein the vertical spacing between adjacent slits is substantially equal to the vertical spacing between centers of adjacent bottles in said stack.

ROBERT B. WHITNEY.
WAYNE B. WEED.

References Cited in the file of this patent

UNITED STATES PATENTS

| Number | Name | Date |
|---|---|---|
| 1,134,277 | Lane | Apr. 6, 1915 |
| 1,449,275 | Feist | Mar. 20, 1923 |
| 1,576,527 | McBride | Mar. 16, 1926 |
| 1,607,983 | Hicks et al. | Nov. 23, 1926 |
| 1,758,150 | Elston | May 13, 1930 |
| 1,893,708 | Kauffman et al. | Jan. 10, 1933 |
| 1,975,364 | Kindred et al. | Oct. 2, 1934 |
| 2,020,062 | Jackson | Nov. 5, 1935 |
| 2,065,536 | Philipp | Dec. 29, 1936 |
| 2,118,800 | Smith | May 24, 1938 |
| 2,185,754 | Rodman | Jan. 2, 1940 |
| 2,212,121 | Krakauer | Aug. 20, 1940 |
| 2,247,575 | De Stefani | July 1, 1941 |
| 2,269,164 | Rinehart | Jan. 6, 1942 |
| 2,290,275 | Childers | July 21, 1942 |
| 2,314,632 | Rear | Mar. 23, 1943 |
| 2,336,382 | Albrecht | Dec. 7, 1943 |
| 2,371,316 | Rice et al. | Mar. 13, 1945 |
| 2,393,370 | Hamilton | Jan. 22, 1946 |
| 2,424,303 | Carlson | July 22, 1947 |
| 2,435,177 | Connell et al. | Jan. 27, 1948 |

FOREIGN PATENTS

| Number | Country | Date |
|---|---|---|
| 26,786 | Great Britain | of 1913 |